United States Patent [19]

Jones, Jr.

[11] 4,214,216
[45] Jul. 22, 1980

[54] FACE-PUMPED LASER WITH DIFFRACTION-LIMITED OUTPUT BEAM

[75] Inventor: William B. Jones, Jr., Scotia, N.Y.

[73] Assignee: General Electric Company, Schenectady, N.Y.

[21] Appl. No.: 947,567

[22] Filed: Oct. 2, 1978

Related U.S. Application Data

[63] Continuation-in-part of Ser. No. 851,445, Nov. 14, 1977, abandoned.

[51] Int. Cl.² ............................................. H01S 3/08
[52] U.S. Cl. ............................... 331/94.5 C; 350/299
[58] Field of Search ............... 331/94.5 PC; 350/299, 350/294

[56] References Cited

U.S. PATENT DOCUMENTS 3,633,126 1/1972 Martin et al. .................. 331/94.5 C

OTHER PUBLICATIONS

Siegman, A. E., Unstable Optical Resonators, Applied Optics, vol. 13, No. 2 (Feb. 1974), pp. 353–367.
Chun et al., Resonant Mode Analysis of Single-Mode Face Pumped Lasers, Applied Optics, vol. 16, No. 4 (Apr. 1977), pp. 1067–1069.

*Primary Examiner*—William L. Sikes
*Assistant Examiner*—Leon Scott, Jr.
*Attorney, Agent, or Firm*—Nathan D. Herkamp; James C. Davis, Jr.; Paul R. Webb, II

[57] ABSTRACT

Diffraction-limited output beam quality is achieved with a laser having an elongated homogeneous active medium pumped through two optically plane, parallel faces and situated within a resonant cavity defined by a plane reflector at one end and a concave spherical reflector at the opposite end. For a ray of optical energy passing through the active medium, there is a plane containing the ray in which the effective optical length in the medium is greater than the effective optical length in the orthogonal plane containing the ray. The separation between the cavity reflectors is selected to form a stable resonator in one of these planes and an unstable resonator in the orthogonal plane.

14 Claims, 2 Drawing Figures

FACE-PUMPED LASER WITH DIFFRACTION-LIMITED OUTPUT BEAM

INTRODUCTION

This application is a continuation-in-part of application Ser. No. 851,445, filed Nov. 14, 1977 and now abandoned.

This invention relates to face-pumped lasers, and more particularly to a method and apparatus for producing a diffraction-limited output beam from a face-pumped laser cavity having a large Fresnel number.

In conventional optically-pumped rod lasers, thermal-optic distortions resulting from heating along with optical pumping are known to limit severely single transverse-mode operation. These distortions manifest themselves as a thermal lensing effect on the laser rod, due to the thermal gradient between the normally-cooled outer surfaces of the active medium and its relatively hot center region, and as a depolarization effect caused by stress distribution in the active medium which produces birefringence therein. While the thermal lensing effect on the laser rod can be approximately compensated, depolarization cannot. As a result of the depolarization effect, the lowest order mode in the active medium cannot build up in phase. Unless losses for the higher order modes can be increased, the laser will therefore naturally oscillate in the higher order modes. Such mode discrimination can be achieved simply by choosing the ratio of the cavity aperture size to cavity length sufficiently small (i.e., small cavity Fresnel number), but optical wavelengths are such that the required ratio is extremely small. As a result, either the active medium aperture must be small and the utilized volume of active material must be small, resulting in low efficiency, or, with a useful aperture size, the length of the cavity resonator must be so large as to be unwieldy. It would be advantageous to provide a simple method and apparatus for achieving mode discrimination without suffering low efficiency and without requiring a cavity resonator of excessive length.

The laser configuration of W. S. Martin, et al., U.S. Pat. No. 3,633,126, issued Jan. 4, 1972 and assigned to the instant assignee, is suitable for obtaining diffraction-limited output beam quality under certain conditions. This suitability derives from the capability of this configuration to provide a self compensation for thermal optic effects, i.e., lensing and depolarization, which effects tend to degrade beam quality in repetitively pulsed operation and provide severe limitations on diffraction-limited performance of laser oscillators and amplifiers. Additionally, the aperture of the active medium in the configuration of Martin et al. is rectangular in shape and may have an aspect ratio significantly greater than unity. Efficient filling of the aperture with a single beam (as distinct from multipassing) requires an oblate beam cross-section. Furthermore, this configuration provides a relatively large diameter region free of thermal optic effects and hence has the capability of supplying a proportionately large amount of energy per pulse if this large aperture can be utilized in the external optical system. Finally, this configuration with, for example, Brewster angle ends acts as a tilted plate and introduces a large amount of astigmatism.

The instant invention discloses an optical cavity which is well suited to utilize the characteristics of the configuration disclosed by Martin et al. for the active laser medium. It is noted that a resonator cavity may be formed by use of a spherical mirror and a plane mirror with the active medium between them. When the active material is astigmatic, then the spherical mirror has two optical centers of curvature separated in space. When the plane mirror is located at a distance from the spherical mirror less than either of these, the cavity is stable. For greater distances than either of these, the cavity is unstable. The instant invention is concerned with that cavity obtained when the plane mirror is located between these two centers of curvature. The cavity is stable, or converging, for rays as referred to the p-plane (i.e., the plane of reflection for a ray through a slab of active medium), and unstable, or diverging, for rays as referred to the s-plane (i.e., the plane perpendicular to the p-plane and containing the ray external to the active medium). Such cavity constitutes a stable/unstable resonator cavity, and essentially no net distortion in the p-plane is experienced by rays passing through the slab of active medium, which characteristic is favorable for obtaining the lowest order stable mode. Further, the aperture of the active medium is smaller in the p-plane which facilitates the arrangement of a cavity with small Fresnel number in this plane. In the s-plane, however, distortion may occur if the pumping and heating are non-uniform across the width of the active medium slab. It would, therefore, be desirable to employ an oscillator resonator which strongly favors the lowest order transverse mode, even if accompanied by some distortion in the cavity.

Accordingly, one object of the invention is to provide a face-pumped laser oscillator having a resonator which strongly favors the lowest order transverse mode.

Another object is to provide a diffraction-limited output beam from a face-pumped laser resonator cavity having a large cavity Fresnel number.

Another object is to provide a resonator for a face-pumped laser which is stable in the p-plane and unstable in the s-plane.

Briefly, in accordance with a preferred embodiment of the invention, a multiple reflection face-pumped laser for emitting a diffraction-limited output beam in a longitudinal direction comprises an elongated slab of homogeneous active medium having at least two longitudinally, optically plane faces extending substantially parallel to each other, the effective optical length of the active medium for a ray of optical energy passing therethrough at an angle to the axis being less in the plane of reflection than in a plane perpendicular to the plane of reflection and containing the ray external to the medium. Pumping means are provided for impinging electromagnetic radiation upon at least one of the optically plane faces to excite atoms of the active medium to a metastable state, thereby producing a population inversion in the medium. The active medium is situated within a cavity resonant to optical energy passing through the active medium in a general direction parallel to the two optically plane faces of the active medium and defined by optically plane reflective means spaced from the active medium at one end thereof and concave spherical reflective means spaced from the active medium at the opposite end thereof, such that the cavity is unstable in the plane perpendicular to the plane of reflection and containing the ray. Optical energy emitted by the active medium in a general direction parallel to the two optically plane faces of the active medium is thus directed normally to the surface of the plane reflective means and normal to the surface of the spherical reflective means at the point of impingement thereon.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
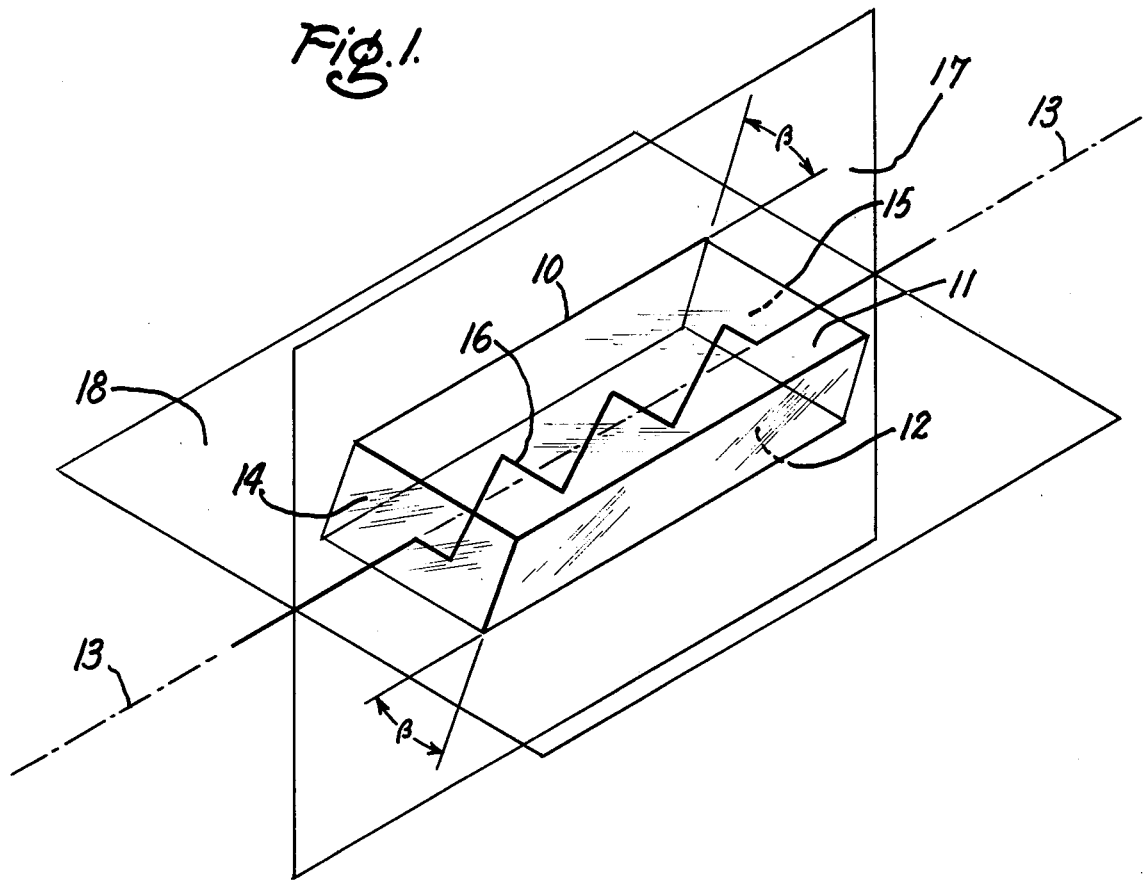
FIG. 1 is an isometric view of a face-pumped laser active medium.

In FIG. 1, a homogeneous active medium 10 in rectangular cross-section, such as employed in the aforementioned Martin et al. U.S. Pat. No. 3,633,126, is illustrated. In one embodiment, the medium may comprise neodymium doped silicate glass. Two optically plane faces 11 and 12 extend parallel to the longitudinal axis 13 of the body to produce a plurality of total internal reflections of a coherent beam of electromagnetic radiation illustrated by path 16. Two optically plane parallel end faces 14 and 15 at each longitudinal end of slab 10 of active medium are situated at Brewster's angle $\beta$ with respect to longitudinal axis 13 as measured in a plane 17 passing perpendicularly through faces 11 and 12 of laser active medium 10. Thus, each ray of coherent beam 16 is introduced into laser active medium 10 at an angle of incidence relative to longitudinally-directed faces 14 and 15 to refract the beam in plane 17 so as to impinge on face 11 or face 12 at an angle such that total internal reflection occurs at these faces. By total internal reflection from faces 11 and 12 alternately, the beam follows a zig-zag course in plane 17, and emerges by refraction from either of end faces 14 and 15 in a manner which causes the beam to coincide with longitudinal axis 13. Plane 17, which is the plane of reflection for ray 16 as it passes through medium 10 is known as the p-plane. Plane 18, which is perpendicular to plane 17 and also includes longitudinal axis 13, is known as the s-plane.

In a face-pumped laser active medium, such as slab 10, optical distortion effects occur as the slab undergoes heating during its operation. Although this heating results essentially in no net distortion in p-plane 17, since slab 10 is well-compensated in the p-plane, distortion can result in s-plane 18 from pumping and heating nonuniformity across the width (i.e., the length of intersection of either of end faces 14 and 15 with plane 18) of slab 10. By fabricating the laser resonant cavity to favor strongly the lowest order transverse mode, it is possible to minimize (or altogether eliminate) the effect of this distortion.

One way of fabricating the laser resonant cavity for single mode operation with a low distortion active medium would be to employ an unstable resonator, i.e., a resonant cavity in which the radiation diverges as it passes between the cavity reflectors. At the output reflector of the cavity, output energy passes beyond the reflector perimeter because the beam cross-section is wider than the reflector. The portion of the beam energy that is reflected from the output reflector for reamplification through the active medium can be geometrically selected so that only a uniphase wavefront is thus returned. For this reason, an unstable resonator can strongly select a uniphase wavefront in the resonant cavity making it possible to produce a diffraction limited output beam from a resonant cavity with a large Fresnel number. Unstable resonators have been discussed extensively in the prior art. See, for example, A. E. Siegman, *Applied Optics*, 13, 353-367 (February, 1974).

A disadvantage of the unstable resonator is that feedback from the output reflector cannot be more than about 10% if good mode control and stability are to be achieved. This requires that the gain through the active medium be relatively high for laser oscillator operation. In common applications of face-pumped lasers, the active medium is in a solid host, is optically pumped, and is of relatively low gain.

A resonator that is stable in the plane of low distortion and unstable in the plane in which there may be distortion makes effective use of the mode selectivity provided by the unstable resonator and, at the same time, allows relatively large (e.g. 50%) feedback from the output reflector. Moreover, the slab width (measured in plane 18) to thickness (measured in plane 17) ratio for a face-pumped laser of the type described herein is usually three or greater. This results in the intracavity aperture of slab 10 being relatively smaller in the plane of low distortion (yielding a small cavity Fresnel number) and larger in the plane with possible distortion (yielding a large cavity Fresnel number). For these reasons, a stable/unstable resonant cavity is well suited to use with a face-pumped laser of the type shown and described in the aforementioned Martin et al. U.S. Pat. No. 3,633,126.

Figure 2:
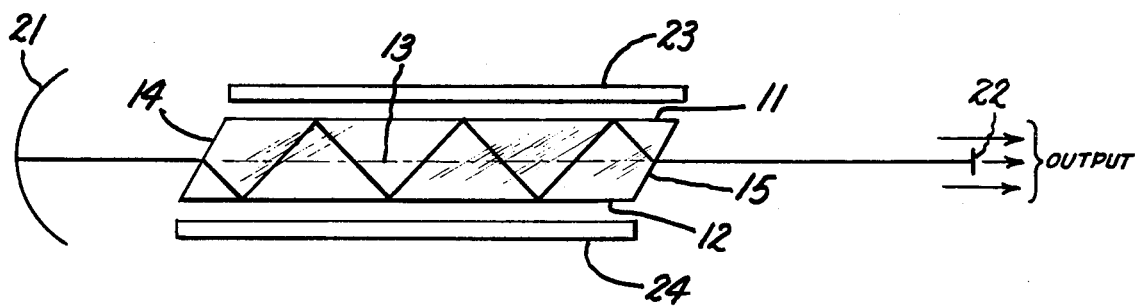
FIG. 2 is a schematic side view of a face-pumped laser employing the instant invention.

A stable-unstable resonant cavity for a laser oscillator is readily implemented with a multiple reflection face-pumped laser slab in its conventional form, as shown in FIG. 2. Thus slab 10, of rectangular cross-section, is fabricated with the beam entrance end faces 14 and 15 at the Brewster angle with respect to longitudinal axis 13. Active medium 10 is conventionally pumped through faces 11 and 12 by flashlamps 23 and 24, respectively, to excite atoms of the active medium to a metastable state and thereby produce a population inversion therein. The effective optical length of slab 10 in the p-plane (which contains the Brewster angle) is less than in the s-plane. Therefore, by employing standard converging cavity optics including, for example, a concave spherical cavity reflector 21 and a plane output reflector 22, the separation between reflectors 21 and 22 can be adjusted so that the laser resonant cavity defined thereby is stable only in the p-plane and is unstable in the s-plane because the effective resonator length in the s-plane is greater than the length necessary for a stable resonant cavity.

The laser described herein provides an oscillator resonant cavity arrangement that yields a near diffraction-limited output beam with efficient use of an active medium in the Mini-FPL configuration. This disclosed resonant cavity is well suited to the Mini-FPL configuration, because the active medium aperture is rectangular, and the residual optical distortion is minimum in the direction of the narrow dimension of the aperture. A stable resonant cavity is applicable for this plane,, because of the small dimension and low distortion. The residual optical distortion in the plane of the large dimension of the active medium aperture results from any deviation from uniformity of inversion pumping distribution. An unstable resonant cavity is the best choice for this plane, because of the high selectivity of the unstable resonator for the lowest order mode.

The stable/unstable resonant cavity of the instant invention is more practical than a pure unstable cavity. This is true because a pure unstable cavity requires a large outcoupling for good alignment stability. However, large outcoupling is incompatible with a low gain active medium, such as Nd:glass. Further, the stable/unstable resonator exhibits good oscillator efficiency, because the intracavity beam cross-section can be adjusted to any oblateness, thereby filling the active medium aperture by the intracavity beam, by using a Brewster ended slab and appropriate spherical cavity mirrors.

In the special case of a concave spherical reflector 21 and plane output reflector 22, the separation of these reflectors is adjusted so that their optical separation in the p-plane is less than the distance to the center of curvature of spherical reflector 21 as viewed through the laser slab, and the optical separation in the s-plane is greater than the distance to the center of curvature of spherical reflector 21 as viewed through the laser slab. This adjustment is easily accomplished since the optical length of the laser slab with the Brewster's angle end faces 14 and 15 is less in the p-plane than in the s-plane (by 41% of the slab length in the case of Nd:glass). The exact separation of the mirrors is adjusted so that the p-plane aperture of the slab is filled by optical energy in the lowest order stable resonator mode. The width of the output mirror (i.e., the s-plane dimension) is adjusted so that the s-plane aperture of the slab is filled by the optical energy in the unstable resonator mode. The reflectivity of the output reflector may be adjusted to obtain optimum output efficiency. Cavity reflectors are not restricted to plane plus concave combinations; reflectors of a wide variety of curvatures may be employed so long as the criteria for the stable/unstable cavity are satisfied. Of course, the curvature of the reflectors must be selected to yield the desired physical length of the resonant cavity, the desired Fresnel number in the p-plane, and the correct degree of instability in the s-plane. An alternative is to use a strip reflector having soft edges; i.e., edges with reflectivity decreasing slowly with distance from the p-plane from maximum reflectivity at the p-plane to small (or zero) reflectivity at the correct distance from the p-plane.

The ends of the laser slab need not necessarily be at Brewster's angle. Other beam entrance angles can be used; nevertheless, Brewster's angle is often the most desirable because reflection losses are zero for p-plane polarized light passing through a surface at Brewster's angle. Thus the apparatus illustrated in FIG. 2 provides a diffraction-limited output beam, directed longitudinally along axis 13, from a multiple reflection face-pumped laser by favoring the lowest order transverse mode therein, without any substantial sacrifice in output power.

The foregoing describes a face-pumped laser oscillator having a resonator which strongly favors the lowest order transverse mode. A diffraction-limited output beam is thus obtainable from a face-pumped laser resonant cavity having a large Fresnel number, the resonator being stable in the p-plane and unstable in the s-plane.

While only preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. A multiple reflection face-pumped laser for emitting a diffraction-limited output beam in a longitudinal direction, comprising:

an elongated slab of homogeneous active laser medium having at least two optically plane faces extending substantially parallel to each other, the effective optical length of said active medium for a ray of optical energy passing therethrough being less in the plane of reflection than in a plane perpendicular to said plane of reflection and containing said ray;

pumping means for impinging electromagnetic radiation upon at least one of said optically plane faces to excite atoms of said active medium to a metastable state so as to produce a population inversion therein;

optically plane reflective means spaced from said active medium at one end thereof; and concave spherical reflective means spaced from said active medium at the opposite end thereof, said plane reflective means and said spherical reflective means defining opposite ends of a cavity resonant to optical energy passing through said active medium in a general direction parallel to said two optically plane faces of said active medium and normal to the surface of said spherical reflective means at the point of impingement thereon, such that said cavity is stable in said plane of reflection but unstable in said plane perpendicular to the plane of reflection.

2. The apparatus of claim 1 wherein said slab is of rectangular cross-section.

3. The apparatus of claim 1 wherein said slab includes an end face at each longitudinal end thereof, each said end face being at the Brewster's angle in said plane of reflection with respect to the longitudinal axis of said slab.

4. The apparatus of claim 2 wherein said slab includes an end face at each longitudinal end thereof, each said end face being at the Brewster angle in said plane of reflection with respect to the longitudinal axis of said slab.

5. The apparatus of claim 1 wherein said optically plane reflective means is of predetermined size, the spacing between said optically plane reflective means and said concave spherical reflective means being selected such that a portion of output energy of said laser passes beyond the perimeter of said plane reflective means.

6. The apparatus of claim 5 wherein said slab of active laser medium is of rectangular cross-section.

7. The apparatus of claim 5 wherein said slab of active laser medium includes an end face at each longitudinal end thereof, each said end face being at the Brewster angle in said plane of reflection with respect to the longitudinal axis of said slab.

8. The apparatus of claim 6 wherein said slab of active laser medium includes an end face at each longitudinal end thereof, each said end face being at the Brewster angle in said plane of reflection with respect to the longitudinal axis of said slab.

9. A multiple reflection face-pumped laser for emitting a diffraction-limited output beam in a longitudinal direction, comprising:

an elongated slab of homogeneous active laser medium having at least two optically plane faces extending substantially parallel to each other, the effective optical length of said active medium for a ray of optical energy passing therethrough being less in the plane of reflection than in a plane perpendicular to said plane of reflection and containing said ray;

pumping means for impinging electromagnetic radiation upon at least one of said optically plane faces to excite atoms of said active medium to a metastable state thereby to produce a population inversion therein; and reflective means disposed at opposite ends of said active medium and defining opposite ends of a cavity resonant to optical energy passing through said active medium in a general direction parallel to said two optically plane faces of said active medium and normal to the surfaces of each of said reflective means at the point of impingement thereon, such that said cavity is stable in said plane of reflection but unstable in said plane perpendicular to the plane of reflection.

10. The apparatus of claim 9 wherein said slab is of rectangular cross-section.

11. The apparatus of claim 9 wherein said slab includes an end face at each longitudinal end thereof, each said end face being at the Brewster angle in said plane of reflection with respect to the longitudinal axis of said slab.

12. The apparatus of claim 10 wherein said slab includes an end face at each longitudinal end thereof, each said end face being at the Brewster angle in said plane of reflection with respect to the longitudinal axis of said slab.

13. The apparatus of claim 1 wherein the optically plane reflective means is a strip reflector of predetermined size.

14. The apparatus of claim 1 wherein the optically plane reflective means is a strip reflector with graded reflectivity on the edges.

* * * * *